US012049813B2

(12) United States Patent
Weddfelt et al.

(10) Patent No.: US 12,049,813 B2
(45) Date of Patent: Jul. 30, 2024

(54) METHOD OF CONTROLLING A DRILLING PROCESS OF A PERCUSSION DRILLING MACHINE

(71) Applicant: EPIROC ROCK DRILLS AKTIEBOLAG, Orebro (SE)

(72) Inventors: Kenneth Weddfelt, Stora Mellösa (SE); Mahdi Saadati, Sollentuna (SE); Samuel Enblom, Orebro (SE); Mattias Gothberg, Orebro (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 233 days.

(21) Appl. No.: 17/593,992

(22) PCT Filed: Mar. 18, 2020

(86) PCT No.: PCT/SE2020/050280
§ 371 (c)(1),
(2) Date: Sep. 29, 2021

(87) PCT Pub. No.: WO2020/204782
PCT Pub. Date: Oct. 8, 2020

(65) Prior Publication Data

US 2022/0186600 A1 Jun. 16, 2022

(30) Foreign Application Priority Data

Mar. 29, 2019 (SE) .................................... 1950389-5

(51) Int. Cl.
*E21B 1/00* (2006.01)
*E21B 10/36* (2006.01)
(Continued)

(52) U.S. Cl.
CPC ................ *E21B 44/02* (2013.01); *E21B 1/00* (2013.01); *E21B 10/36* (2013.01); *G08B 21/182* (2013.01)

(58) Field of Classification Search
CPC combination set(s) only.
See application file for complete search history.

(56) References Cited

U.S. PATENT DOCUMENTS 4,671,366 A 6/1987 Uitto et al.
5,303,592 A * 4/1994 Livingston ............ G01N 29/27 73/152.01

(Continued)

FOREIGN PATENT DOCUMENTS

CN 101180450 A 5/2008
CN 101392529 A 3/2009

(Continued)

OTHER PUBLICATIONS

International Search Report and Written Opinion in corresponding International Application No. PCT/SE2020/050280 dated Jun. 18, 2020 (10 pages).

(Continued)

*Primary Examiner* — Giovanna Wright
*Assistant Examiner* — Ronald R Runyan
(74) *Attorney, Agent, or Firm* — Sage Patent Group

(57) ABSTRACT

The drilling machine comprises a control unit and at least one sensor. The drilling machine further comprises a percussive element and a tool, wherein an end of the tool comprises a drill bit configured to strike rock. The percussive element is configured to impact the tool and the tool is configured to transfer impulse energy generated by the percussive element to the drill bit. The method during drilling comprises collecting data depending on force fed into the rock and indentation depth into the rock at an impact
(Continued)

of the percussive element. The method further comprises determining a percussion procedure based on the collected data, and determining a deviation between the percussion procedure and a reference percussion procedure. The method further comprises adjusting one or more drilling parameters related to the drilling process based on the deviation.

11 Claims, 5 Drawing Sheets

(51) Int. Cl.
*E21B 44/02* (2006.01)
*G08B 21/18* (2006.01)

(56) References Cited

U.S. PATENT DOCUMENTS

| | | | |
|---|---|---|---|
| 6,640,205 B2 | 10/2003 | Bongers-Ambrosius et al. | |
| 7,114,576 B2 | 10/2006 | Keskiniva | |
| 2004/0040746 A1 | 3/2004 | Niedermayr et al. | |
| 2010/0025106 A1* | 2/2010 | Weddfelt | E21B 1/38 175/24 |
| 2010/0147084 A1 | 6/2010 | Keskiniva et al. | |
| 2011/0147084 A1 | 6/2011 | Sinnerstad et al. | |

FOREIGN PATENT DOCUMENTS

| | | | |
|---|---|---|---|
| CN | 101427002 | A | 5/2009 |
| CN | 101798916 | A | 8/2010 |
| CN | 102164714 | A | 8/2011 |
| CN | 102171411 | A | 8/2011 |
| CN | 203808986 | U | 9/2014 |
| CN | 105339579 | A | 2/2016 |
| CN | 108131126 | A | 6/2018 |
| GB | 1253717 | A | 11/1971 |
| JP | 2008542587 | A | 11/2008 |
| SE | 8004911 | L | 1/1982 |
| WO | 9219841 | A1 | 11/1992 |
| WO | 0235062 | A1 | 5/2002 |
| WO | 2006062460 | A1 | 6/2006 |
| WO | 2006126933 | A1 | 11/2006 |
| WO | 2008127173 | A1 | 10/2008 |
| WO | 2009123535 | A1 | 10/2009 |
| WO | 2009148376 | A | 12/2009 |
| WO | 2010037905 | A1 | 4/2010 |

OTHER PUBLICATIONS

Swedish Search Report in corresponding Swedish Patent Application No. 1950389-5 dated Oct. 15, 2019 (2 pages).
K.Hashiba et al.; "Force-penetration curves of a button bit generated during impact penetration into rock"; International Journal of Impact Engineering; vol. 85; 2015; pp. 45-56 (12 pages).
K.Hashiba et al.; Modeling of force-penetration curves for a button bit during impact penetration into rock; International Journal of Rock Mechanics & Mining Sciences; vol. 93; 2017; pp. 210-214 (5 pages).
Office Action dated Jul. 12, 2023 for Chinese Patent Application No. 202080024616.6, 9 pages.
Saadati, M. et al.; "Granite Rock Fragmentation at Percussive Drilling—Experimental and Numerical Investigation"; International Journal for Numerical and Analytical Methods in Geomechanics; vol. 38, No. 8; Jun. 2014; 35 pages.
Office Action mailed Nov. 8, 2023 for Japanese Patent Application No. 2021-557887, 4 pages.

* cited by examiner

METHOD OF CONTROLLING A DRILLING PROCESS OF A PERCUSSION DRILLING MACHINE

CROSS-REFERENCE TO RELATED APPLICATIONS

This application is a U.S. National Stage application of PCT/SE2020/050280, filed Mar. 18, 2020 and published on Oct. 8, 2020 as WO 2020/204782, which claims the benefit of Swedish Patent Application No. 1950389-5 filed Mar. 29, 2019, all of which are hereby incorporated by reference in their entireties.

TECHNICAL AREA

The present invention relates to mining industry. More in particular, the invention relates to a method of controlling a drilling process of a drilling machine. The invention further relates to a drilling machine configured to be controlled by the method during drilling.

BACKGROUND

In mines and other work sites, rock drills mounted on rigs are used to drill holes in the bedrock. Percussive rock drilling is a common method to drill in rock. During percussive rock drilling, rock is crushed by a drill bit striking the rock at a high frequency, whereby buttons arranged on the drill bit crush the rock. The drill is rotated in order for the buttons to hit new rock surfaces with each impact. Since drilling is often performed in deep holes, the drill bit is often arranged on a drill rod, which is in turn arranged on an adapter mounted in a drilling machine. The adapter, the drill rod and the drill bit together form an assembly called a drill string. In a percussive drilling machine, a percussive element, such as a percussive piston, impacts the adapter, whereby the impulse is distributed along the drill string, down the hole and finally into the rock via the drill bit. One or more drill rods may be joined to extend the drill string. Examples of common drilling methods are top hammer drilling, Down-the-Hole (DTH) and COPROD.

To ensure contact between the drill bit and the rock and that the adapter is in a preferred position in the drilling machine during drilling, a feed force, directed towards the rock, is applied to the drilling machine, e.g. by a hydraulic piston. Hence, the feed force acts on the drill string and on the rock through the drilling machine.

Regardless of the employed drilling process, drilling is an energy-consuming task which is often carried out in remote areas, using sophisticated equipment. The drilling equipment is further exposed to demanding working conditions which results in significant wear. A more efficient drilling process and consequently less wear, less energy consumption and a lesser impact on the environment is therefore desired.

Rock drilling is a complex task which depends on a range of different factors, for instance type of drilling machine, rock character, and the selection of drilling parameters. Drilling is further carried out under shifting conditions which means that the different factors will vary during the operation. The rock is, for instance, not homogeneous and the equipment wears down, which affects the drilling. The drilling process therefore needs to be adjusted during operation in order to adapt to these variations.

It is previously known to control a drilling process during operation in order to increase drilling efficiency. To control the drilling process it is necessary to measure the progress of an ongoing drilling operation, i.e. in order to determine whether the ongoing drilling operation is "good" or "bad". It has been shown that the wavefield generated in the drill rod during percussive drilling contains information on the efficiency of the drilling operation. It can be studied by monitoring an amplitude of the incident wave from the percussive element through the drill string towards the rock, and an amplitude of the reflected wave, travelling from the rock through the drill string towards the drilling machine. By an incident wave is here meant the impulse travelling though the drill string as a result of the percussive element impacting the drill string. By a reflected wave is here meant the reflected impulse travelling through the drill string as a result of the incident wave meeting a change of impedance, e.g. at an end of the drill string.

Document US 2010/0147084 A1 describes how the amplitudes of these impulses are studied to control a drilling machine.

Document U.S. Pat. No. 6,640,205 B2 uses the impulse travelling through a drilling tool to characterize the material that is being drilled. A working mode of the tool is thereafter proposed or configured, based on this characterization.

Document U.S. Pat. No. 7,114,576 B2 describes how percussion energy is adjusted according to the amplitude of the impulse in the drill string.

The methods described in prior art give an incomplete view of the drilling process, which means that the control of the drilling process is not as efficient as it could be, given a better description of the drilling. There is therefore a continued need to develop the control of drilling processes of drilling machines so that they work in an efficient manner.

SUMMARY OF THE INVENTION

An object of the present invention is therefore to achieve a method of controlling a drilling process of a drilling machine which, compared to prior art, in a better way can determine how efficient an ongoing drilling process is and adjusts the drilling accordingly. An alternative object is to achieve an alternative solution compared to prior art.

This object is achieved according to a first aspect by a method of controlling a drilling process of a drilling machine. The drilling machine comprises a control unit, at least one sensor, a percussive element and a tool, wherein an end of the tool comprises a drill bit configured to strike rock. The percussive element is further configured to impact the tool and the tool is configured to transfer impulse energy generated by the percussive element to the drill bit. The method during drilling further comprises collecting data depending on force fed into the rock and indentation depth into the rock at an impact of the percussive element. The method further comprises determining a percussion procedure based on the collected data and determining a deviation between the percussion procedure and a reference percussion procedure. The method further comprises adjusting one or more drilling parameters related to the drilling process based on the deviation.

Since the drilling machine comprises a sensor, the drilling machine may collect data depending on the force fed into the rock and indentation depth into the rock at an impact of the percussive element on the drill string. The sensor may be configured to extract data depending on both the force fed into the rock and the indentation depth into the rock by making measurements on the drill string.

The collected data may comprise data related to strain of the tool during operation. For instance, the sensor may measure the axial strain signal or and/or the axial stress signal of a drill rod of the drill string which is generated when the drill bit impacts the rock. By indentation depth is here meant how deep the buttons of the drill bit penetrate into the rock. By the force fed into the rock is here meant the force with which the tool impacts the rock.

Since the drilling machine comprises a control unit, all the steps of the method may be performed by the control unit such that an autonomous drilling machine is achieved. The drilling process may then be made more efficient and the risk of injury to personnel is reduced since they do need to stay in the vicinity of the drilling machine. Alternatively, parts of the method may be performed by the control unit and other parts by an operator or by another system. The control unit may then, for instance, present information relating to the drilling process to the operator, who may use it to control the drilling machine. Critical decisions may then be made by an operator, which may reduce the risk that the drilling machine drills in an unfavorable manner from a wear- or efficiency-point of view.

By determining a percussion procedure which is based on data depending on the force fed into the rock and indentation depth into the rock, a precise image of how the tool interacts with the rock is obtained. By determining a percussion procedure there if further obtained a description of the whole percussion procedure, which provides further information on the machine-rock interaction compared to e.g. only monitoring one parameter over time, such as the amplitude of the impulse. The actual drilling process may therefore be determined in a better manner than by previously known methods. Further, by determining a deviation between the actual percussion procedure and a reference percussion procedure, and by adjusting one or more drilling parameters related to the drilling process based on the deviation, a very efficient drilling process is achieved.

Thus, a method of controlling a drilling process of a drilling machine is provided, which method may determine an efficiency of a current drilling process and adjust the drilling accordingly.

The one or more drilling parameters may for instance relate to one or more of: flushing flow, rotation speed of the rock drill, feed force, percussion power, percussion frequency, stroke length, percussion speed, rotational torque or waveform of an impulse.

The reference percussion procedure may according to some embodiments describe a desired drilling process. The drilling process may then be controlled such that the actual percussion procedure aligns with the reference percussion procedure as far as possible in order to provide an actual drilling process which corresponds as closely as possible to a desired drilling process.

According to some embodiments, the step of adjusting said one or more drilling parameters comprises adjusting said one or more drilling parameters such that the deviation is reduced. By adjusting the parameters such that the deviation is reduced, a simple way of controlling the drilling process towards a drilling where the actual percussion procedure aligns with the desired reference percussion procedure is achieved. A more efficient drilling process is thereby achieved.

According to some embodiments, the percussion procedure consists of a force-displacement curve determined based on the collected data. Further, the reference percussion procedure may consists of a reference force-displacement curve determined based on the desired drilling process.

Since the percussion procedure consists of a force-displacement curve, a complete and detailed description of the percussion procedure is obtained, where a loading and unloading of the tool during indentation and retraction from the current hole in the rock is presented. Thereby, the actual drilling process is determined since the efficiency of the progress into the rock is described by the feed force versus the actual indentation depth. The difference between an efficient, or good, drilling and an inefficient, or bad, drilling is in this way much more apparent than by indirect studies, such as by comparing impulse amplitude, etc. By working with a force-displacement curve, a comparison between the actual percussion procedure and the desired percussion procedure may be made in a more simple manner, such as by a simple comparison of the graphs using a square mean value, or similar. It is also apparent in what way the percussion procedure differs from the desired percussion procedure, which means that the deviation may be analyzed in a simple manner to find an optimal way of adjusting the drilling process.

The method may, according to some embodiments, be performed with each impact of the percussive element. Thereby there is provided a method of controlling the drilling process which responds quickly to changes and where each adjustment yields quick feedback. Thus is a method provided which may quickly and efficiently control the drilling process towards a desired drilling process, and which may also respond quickly to changes in the rock.

According to some embodiments, the method further comprises analyzing properties of the deviation, and based on said analysis determining one or more first drilling parameters, that need to be adjusted, out of said one or more drilling parameters. The step of adjusting said one or more drilling parameters comprises adjusting said one or more first drilling parameters such that the deviation is reduced.

By analyzing the properties of the deviation, and based on that, determining which drilling parameters should be adjusted, the drilling process may be controlled more efficiently towards a desired drilling process. For instance, the drilling parameters which are considered to have the greatest effect on the deviation may be adjusted and other drilling parameters may be held constant. In this way, there is provided a more predicable adjustment of the drilling process, which leads to reduced fluctuations in the system and to a more efficient control.

According to some embodiments, the method further comprises analyzing properties of the deviation and, based on said analysis, determining a first manner of adjusting the one or more drilling parameters such that the deviation is reduced. The step of adjusting said one or more drilling parameters comprises adjusting said one or more drilling parameters in said first manner such that said deviation is reduced.

In the same way as described hereinabove, regarding which drilling parameters should be adjusted, it is advantageous to determine how or in which way the drilling parameters should be adjusted to reduce the deviation. By following these steps there is thereby provided a predictable adjustment of the drilling process with reduced fluctuations in the system and a more efficient control.

These two steps of analyzing properties of the deviation may advantageously be combined.

According to some embodiments, the method further comprises executing a critical action if the deviation exceeds a threshold value. The critical action comprises one or more of visually indicating that the threshold value has been exceeded, indicating that the threshold value has been exceeded by emitting an audio signal, and interrupting the drilling process.

By a critical action is herein meant an action which is carried out if the drilling process is determined to proceed outside of what may be considered a normal drilling process. The risk of damaging the machine or its surroundings is then greater, which should obviously be avoided. Whether the drilling process is outside a normal process interval is determined by comparing the deviation with a threshold value. If the deviation exceeds the threshold value, the drilling process is outside an acceptable process interval. This may, for instance, happen if the drill has penetrated into a tunnel or into a pipe, or if the rock suddenly changes character, making the drilling process completely erroneous. In such cases, an alarm may sound or be shown visually. Alternatively, the drilling process may be completely shut down if there is a risk of damage to the machine or to its surroundings.

According to some embodiments, the method further comprises evaluating how the deviation has changed after the adjustment, and adjusting said one or more drilling parameters based on the evaluation such that the deviation is reduced.

By evaluating how the deviation has changed after the adjustment, it is easy to determine whether the deviation decreases or increases. Since the drilling process is complex and depends on a number of factors, such as rock character and the drilling parameters, a reduced deviation cannot be guaranteed after a given adjustment. Therefore, it may be advantageous to evaluate how the deviation has changed after adjusting the drilling parameters. Based on knowledge of how the drilling parameters change and how it affected the deviation, a new adjustment may be determined which will more probably lead to a reduction of the deviation. By also basing the adjustment on such an evaluation the risk of system fluctuations, due to repeated changes of drilling parameters without considering how each change affects the deviation, is also reduced.

The evaluation may further comprise collecting a subsequent set of data depending on force fed into the rock and indentation depth into the rock at a subsequent impact of the percussive element. The evaluation then further comprises determining a subsequent percussion procedure based on the collected data, and determining a subsequent deviation between the subsequent percussion procedure and the reference percussion procedure. Thereafter it is evaluated how the deviation has changed after the adjustment based on a comparison between the deviation and the subsequent deviation.

Thus two consecutive deviations are determined, one deviation before adjustment of the drilling parameters and one deviation after adjustment of the drilling parameters. Hereby, the deviations may be compared in a simple manner and the results of the comparison may serve as a basis for the next adjustment of the drilling parameters. An efficient method of controlling a drilling process of a drilling machine is thus achieved, which method is robust and guarantees that the deviation between the actual percussion procedure and the reference percussion procedure will decrease over time.

The object above is also achieved according to a second aspect by a drilling machine comprising a control unit, at least one sensor, a percussive element and a tool, wherein an end of the tool comprises a drill bit configured to strike rock. The percussive element is configured to impact the tool and the tool is configured to transfer impulse energy generated by the percussive element to the drill bit. The control unit is configured to control the drilling machine during drilling according to the method described above. Since the control unit is configured to control the drilling machine according to the method above, the same advantages as above are achieved. Thereby, a drilling machine is obtained whose drilling process is controlled according to a method that can determine how efficient the current drilling process is and that can adjust the drilling accordingly.

Also, since the control unit controls the drilling machine, there is provided a drilling machine whose drilling process may performed autonomously or semi-autonomously, i.e. completely without, or with limited input from an operator. The drilling process may thereby be performed more efficiently.

According to some embodiments, the at least one sensor is configured to collect data depending on force fed into the rock and indentation depth into the rock at an impact of the percussive element. The collected data may comprise data related to strain of the tool during operation. For instance, the sensor may measure the axial strain signal and/or the axial stress signal of a drill rod of the drill string which is generated when the drill bit impacts the rock.

The drilling machine may for instance be a rock drilling machine.

DESCRIPTION OF DRAWINGS

Further objects and advantages of, and features of the invention will be apparent from the following description of one or more embodiments, with reference to the appended drawings, where.

DETAILED DESCRIPTION

The present invention is described in more detail below, with references to the appended drawings showing examples of embodiments. The invention should not be viewed as limited to the described examples of embodiments, instead it is defined by the appended patent claims. Like numbers refer to like elements throughout the description.

Figure 1:
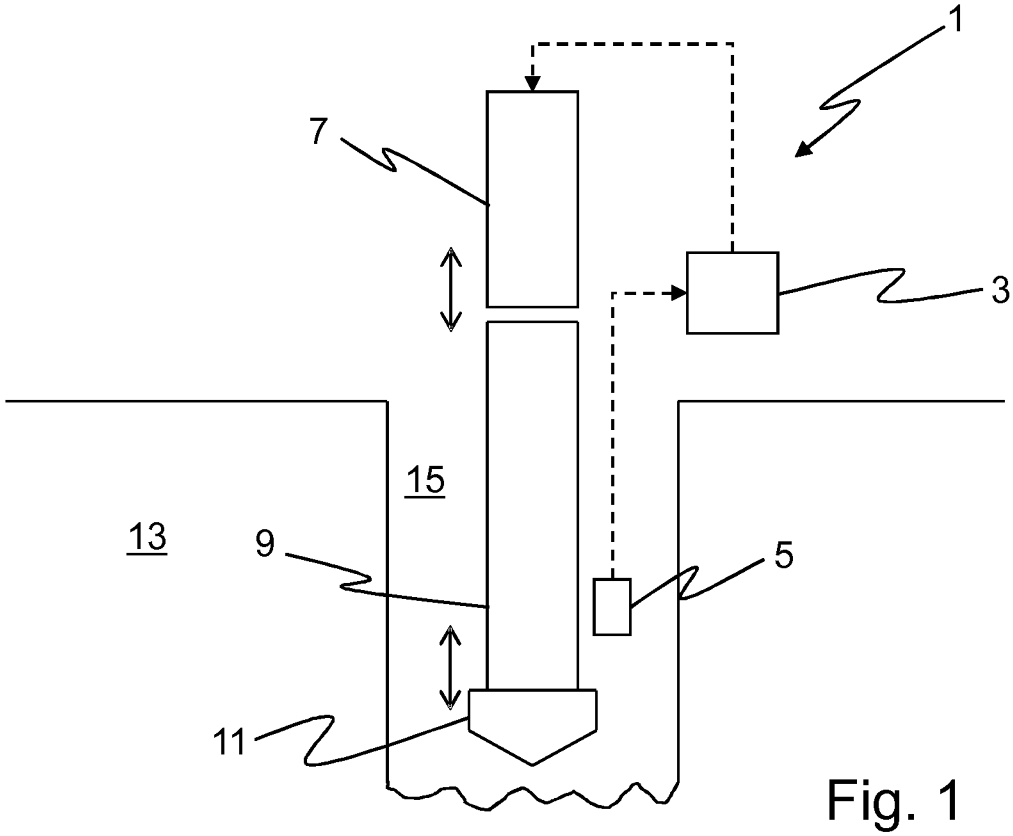
FIG. 1 shows a schematic view of an exemplary drilling machine.

FIG. 1 shows very schematically an exemplary drilling machine 1. The drilling machine 1 comprises a control unit 3 and at least one sensor 5. The drilling machine 1 further comprises a percussive element 7 and a tool 9. The percussive element 7 may for instance be a percussive piston and the tool 9 may for instance be a drill string consisting of an adapter, one or more connected drill rods and a drill bit 11 configured to strike rock 13. An end of the tool 9 comprises the drill bit 11. The percussive element 7 is configured to impact the tool 9 at high speed. The tool 9 is in turn configured to transfer impulse energy generated by the percussive element 7 to the drill bit 11. The drill bit 11 will then strike the rock 13, whereby buttons (not shown) arranged on the drill bit will indent the rock 13 and will make progress into the rock 13, making a hole 15 in the rock.

As described above, rock drilling is an energy-consuming activity. Both properties and features of the rock, the properties of the tool 9, such as type of bits, material, size, etc., as well as the drilling parameters that are used, will affect the drilling process. By drilling parameters is hereby meant flushing pressure, flushing flow, percussion speed, rotational speed, feed force, etc.

It is often desirable to determine whether the current drilling proceeds in a desirable manner and, if that is not the case, adjust the drilling so that it better corresponds to a desired drilling process. This is especially important for autonomous or semi-autonomous drilling, where the control unit 3 controls large parts, or the whole, drilling process.

The desired drilling process may vary. The desired drilling process may for instance be to drill using a minimum of energy for a given depth of the hole 15. Or a fast drilling process may be desired. Some of these wishes may counteract each other. A fast drilling process may for instance lead to increased wear of the tool 9. Other wishes may cooperate.

Regardless of the desired drilling process, the efficiency or capability of the current drilling process has to be quantifiable. The know methods of prior art, for quantifying the current drilling process, do not describe the actual drilling process well enough, and therefore the control of the drilling process becomes blunt.

To solve this problem, the sensor 5, according to the invention, collects measured data depending on force fed into the rock 13 and indentation depth into the rock 13 at an impact of the percussive element 7. Thus, when the percussive element 7 impacts the tool 9 and the tool 9 impacts the rock 13 and recoils, the sensor 5 collects these measurement data. The sensor 5 may for instance collect these data by measuring the axial strain of the tool 9 at the impact. A percussion procedure is thereafter determined based on the collected data. The percussion procedure describes the whole course of the impact and is therefore based on the force fed into the rock 13 as well as the indentation depth into the rock 13. The percussion procedure may then be compared to a reference percussion procedure. The reference percussion procedure may describe a desired drilling process. The current percussion procedure may be compared to the reference percussion procedure by determining a deviation between the two percussion procedures. Based on that deviation, one or more drilling parameters related to the drilling process may then be adjusted. The drilling parameters may for instance be adjusted such that deviation is reduced. Naturally, it may always be determined that the deviation will be reduced upon adjustment of the drilling parameters. Therefore, the expression "such that deviation is reduced" should be interpreted such that the drilling parameters are adjusted with the intention to reduce the deviation by the adjustment.

The drilling machine 1 is configured to at least partly be controlled by the control unit 3, based on the measured data collected by the sensor 5 and the comparison between the percussion procedure and the reference percussion procedure.

Figure 2:
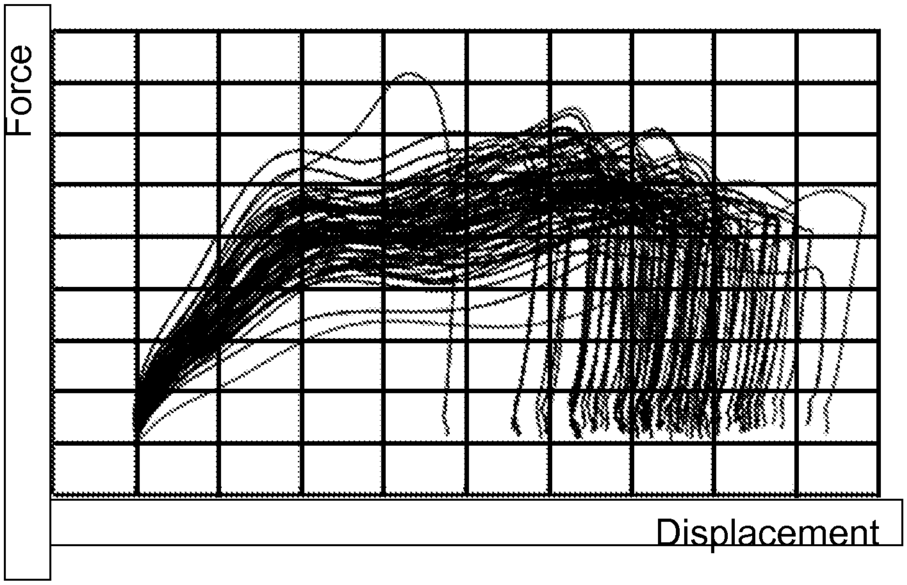
FIG. 2 shows a number of number of force-displacement curves.

The percussion procedure may be represented by a force-displacement curve determined based on the collected data. FIG. 2 shows a number of force-displacement curves based on data provided by lab measurements and exemplifies how the force-displacement curve may vary during drilling. The force F fed into the rock is shown along the y-axis and the indentation depth into the rock is shown along the x-axis. As demonstrated by FIG. 2, the force-displacement curve may vary considerably during drilling, in the same rock and with the same drilling parameters. The change in the force-displacement curve is correlated with the drilling efficiency. The force-displacement curves describe a percussion procedure of the tool, with an initial load phase of the tool when the buttons indent the rock and a concluding unload phase when the tool is retracted from the newly made hole.

A desired force-displacement curve which represents a desired drilling process having a desired drilling efficiency may be determined by studying force-displacement curves for different drilling processes and by correlating efficient drilling processes with a certain type of force-displacement curve. In this manner, a reference percussion procedure is obtained, which is represented by a reference force-displacement curve. By thereafter determining force-displacement curves for impacts of the tool 9 into the rock 13 during drilling, these may be compared to the desired force-displacement curve. The drilling parameters may later be adjusted based on this comparison.

The force-displacement curve may for instance be determined by selecting a time window from the time data of the axial wave of the incident and reflected impulse. A known length of the drill bit is used for the time window, as well as a sensor giving the axial strain wave in the drill bit. The sensor may also be arranged in different positions on the drill bit or on the neck. The position will affect the measured signal, which has to be taken into consideration. The force-displacement curve may be determined according to the following.

$$\sigma_{inc} = \varepsilon_{inc} E$$

$$\sigma_{ref} = \varepsilon_{ref} E$$

$$F = A_{rod}(\sigma_{inc} + \sigma_{ref})$$

$$v_{bit} = \frac{1}{c\rho}(\sigma_{inc} - \sigma_{ref})$$

$$d = \int v_{bit} dt$$

where $\sigma_{inc}$ is the stress of the incident wave, $\sigma_{ref}$ is the stress of the reflected wave, E is the module of elasticity. Further:

$\varepsilon_{inc}$=selected strain signal around the incident wave, selected by using a trigger from the time data or a reference pulse from the impact and geometry and wave velocity in the rod.

$\varepsilon_{ref}$=selected strain signal around the reflected wave, selected by determining a selection time in relation to sensor position of $\varepsilon_{inc}$ and geometry of the rod and of the drill bit as well as wave velocity.

Other methods of determining the force-displacement curves are also comprised by the invention. For instance, the calculation has to be adjusted when multiple sensors are used. The methods are generally known in the fields of signal processing and wave propagation and will consequently not be further discussed here.

Figure 3:
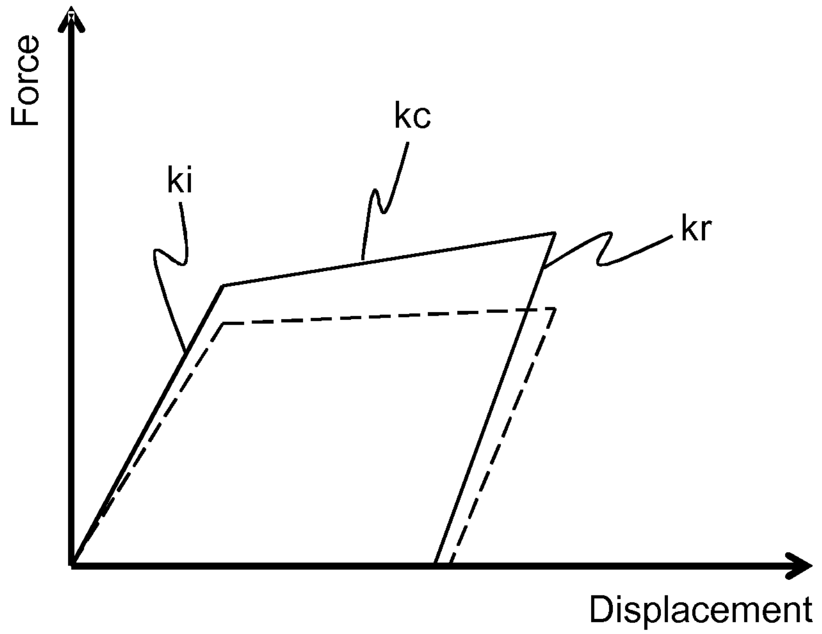
FIG. 3 shows a schematic force-displacement curve and a schematic reference force-displacement curve.

FIG. 3 shows an example of a schematic force-displacement curve represented by three vectors ki, kc, kr. Force fed into the rock is shown along the y-axis and the indentation depth is shown along the x-axis. The vectors ki and kc represent the load phase and kr represents the unload phase.

The reference percussion procedure may also be constituted by a force-displacement curve determined by the desired drilling process. In FIG. 3 the reference curve is shown as a dashed line. The force-displacement curves, and thereby the percussion procedures, may for instance be compared to the method of least squares to obtain a deviation between the curves. Other ways of comparing the curves may for instance be to compare part-curves via measurement data, such as slope and length. The measurement data may be expressed in absolute numbers as well as in relative terms, i.e. in relation to each other. Other examples comprise studying the angle of the vectors ki, kc and kr.

Figure 4A:
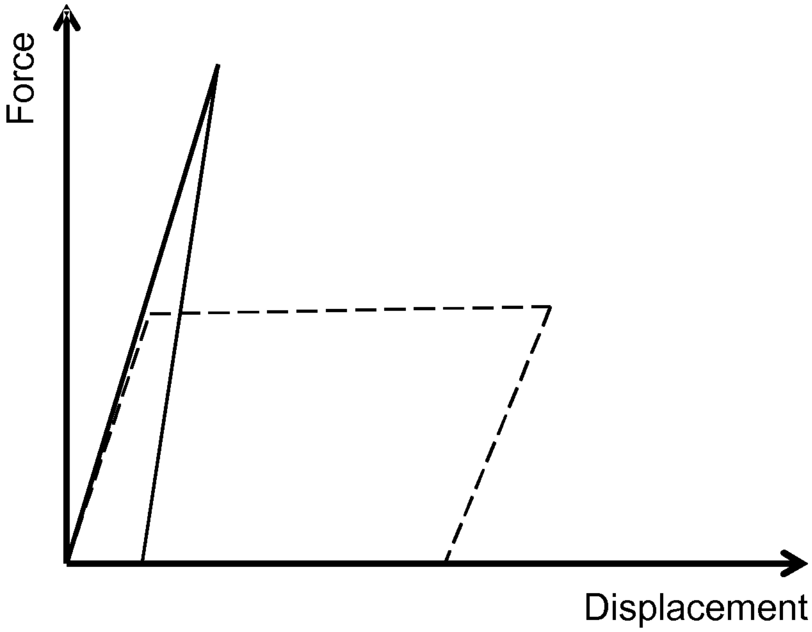
FIG. 4*a* shows a schematic force-displacement curve and a schematic force-displacement curve according to a first example.
Figure 4B:
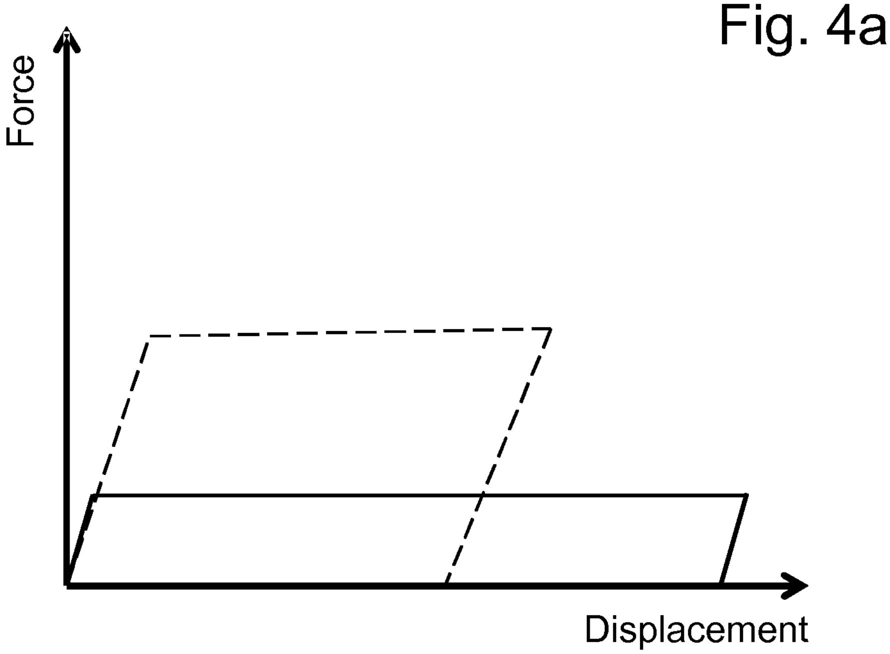
FIG. 4*b* shows a schematic force-displacement curve and a schematic force-displacement curve according a second example.

By determining a percussion procedure, the deviation between the current percussion procedure and the reference percussion procedure may be analyzed. FIGS. 4*a* and 4*b* illustrate how a comparison between the force-displacement curve of the current percussion procedure and the force-displacement curve of the reference percussion procedure may be used to analyze the deviation.

In FIG. 4*a* a schematic current percussion procedure is shown as a continuous line and a reference percussion procedure is shown as a dashed line. The reference percussion procedure represents a desired percussion procedure. As shown in FIG. 4*a*, the buttons do not seem to penetrate very deep into the rock. Concurrently, the feed force is high for a short time. This may mean that the rock is too hard or that the rotational speed of the drill string is too low. This information may thus be used to determine which drilling parameters to adjust, i.e. rotational speed, and how it should be adjusted, i.e. to increase the speed.

Also FIG. 4*b* schematically shows a current percussion procedure as a continuous line and a reference percussion procedure as a dashed line. The reference percussion procedure represents a desired percussion procedure. As can be seen in FIG. 4*b*, the buttons seem to penetrate deeper than expected and the force fed into the rock is lower than expected. This may mean that the flushing flow is too low, resulting in drill cuttings remaining in the hole 15, or that the rock 13 is too soft. This analysis may therefore be used to increase the flushing pressure or the flow, i.e. selecting a drilling parameter to adjust and deciding how this drilling parameter should be adjusted.

Thus, based on this analysis, it is possible to determine one or more first drilling parameters from said one or more drilling parameters that need to be adjusted to reduce the deviation. In addition, based on this analysis, it is possible to determine a first manner of adjusting the one or more drilling parameters such that the deviation is reduced.

The deviation between the percussion procedure and the reference percussion procedure may also be used to ensure that the drilling process proceeds in a manner that is safe for the equipment and for its surroundings. By making sure that the deviation is below a certain threshold value it may be assured that the drilling process is running normally. If the drilling machine 1 should penetrate into a tunnel and no longer hit rock, the deviation would increase abruptly and exceed the threshold value. In such an occurrence, the control unit 3 may execute a critical action. The critical action may for instance comprise visually indicating that the threshold value has been exceeded, such as to an operator. An alarm may be made to sound when the threshold value has been exceeded, or the drilling process may be interrupted to ensure that the machine does not suffer damage.

A method 500 of controlling a drilling process of a drilling machine 1 will now be described, referring to FIG. 5. Optional method steps are shown with dashed lines in the drawings.

The method steps described below may for instance be carried out by the control unit 3.

Figure 5:
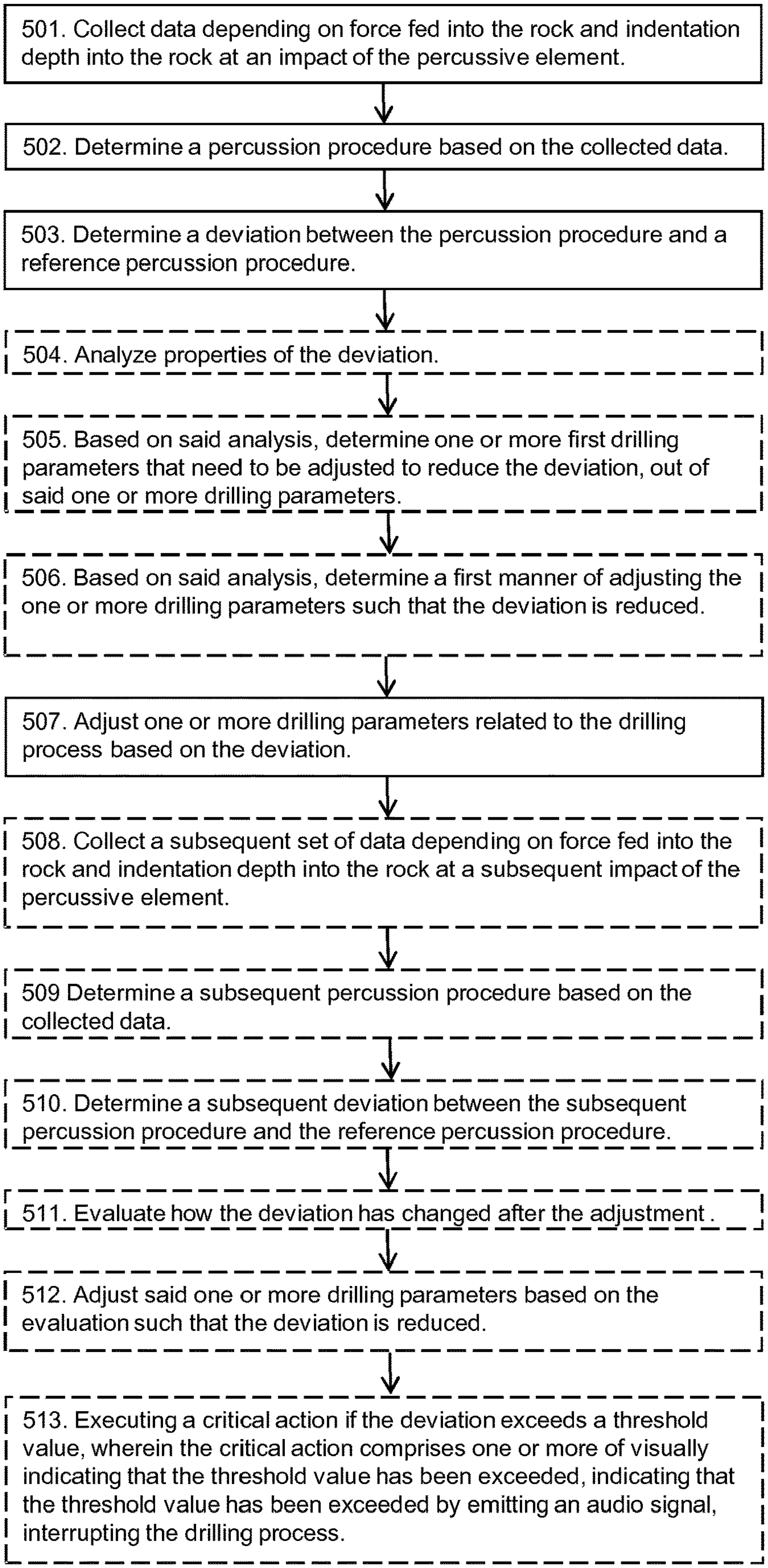
FIG. 5 shows a flow chart of a method of controlling a drilling process of a drilling machine.

FIG. 5 shows an exemplary method 500 of controlling a drilling process of drilling machine 1. The drilling machine 1 comprises a control unit 3, at least one sensor 5, a percussive element 7 and a tool 9. An end of the tool 9 comprises a drill bit 11 configured to strike rock 13. The percussive element 7 is configured to impact the tool 9, and the tool 9 is configured to transfer impulse energy generated by the percussive element 7 to the drill bit 11. The method during drilling comprises collecting 501 data depending on force fed into the rock and indentation depth into the rock at an impact of the percussive element 7. The method further comprises determining 502 a percussion procedure based on the collected data. The method further comprises determining 503 a deviation between the percussion procedure and a reference percussion procedure. The method further comprises adjusting 507 one or more drilling parameters related to the drilling process based on the deviation.

The deviation between the reference percussion procedure and the actual percussion procedure may be determined in a number of different ways depending on how the percussion procedures are represented as describe above.

The reference percussion procedure may for instance be determined empirically, based on previous drilling processes which were considered, or which have proved to be efficient, e.g. from an energy point of view or in terms of progress into the rock. The reference percussion procedure may describe a drilling process where a certain parameter is optimized, such as drilling speed, energy consumption or minimized wear of the drill. Optimization of these parameters may then be made at the cost of some other parameter, such as energy efficiency, etc. Alternatively, the reference percussion procedure may describe a drilling process which is considered to be an optimal or efficient drilling when a number of parameters are balanced against each other. It is also conceivable that the reference percussion procedure has been determined by calculations or simulations and therefore describes and optimized procedure. The reference percussion procedure may for instance be picked from a database.

According to certain embodiments, the step of adjusting 507 said one or more drilling parameters may comprise adjusting 507 said one or more drilling parameters such that the deviation is reduced.

The method may further comprise analyzing 504 properties of the deviation and based on said analysis, determine 505 one or more first drilling parameters that need to be adjusted to reduce deviation, out of said one or more drilling parameters. The step of adjusting 507 said one or more drilling parameters comprises adjusting 507 said one or more first drilling parameters such that the deviation is reduced.

The method may further comprise analyzing 504 properties of the deviation, and based on said deviation determining 506 a first manner of adjusting the one more drilling parameters such that the deviation is reduced. The step of adjusting 507 said one or more drilling parameters then comprises adjusting 507 said one or more drilling parameters in said first manner such that the deviation is reduced.

What is meant by "a first manner" depends on what drilling parameter should be changed. If it relates to percussion speed, the first manner may be to increase or to decrease the percussion speed. If it relates to flushing pressure, the first manner may be to increase or decrease the flushing pressure, etc. A skilled person would immediately realize what it means to adjust a parameter in a certain manner, i.e. a first manner, given that the parameter is known. This will therefore not be further described.

The method may further comprise executing 513 a critical action if the deviation exceeds a threshold value, wherein the critical action comprises one or more of visually indicating that the threshold value has been exceeded, indicating that the threshold value has been exceeded by emitting an audio signal, and interrupting the drilling process.

The method may further comprise evaluating 511 how the deviation has changed after the adjustment 507. The method then further comprises adjusting 512 said one or more drilling parameters based on the evaluation such that the deviation is reduced. According to some embodiments, the method may then further comprise collecting 508 a subsequent set of data depending on force fed into the rock and indentation depth into the rock at a subsequent impact of the percussive element. The method then further comprises determining 509 a subsequent percussion procedure based on the collected data and determining 510 a subsequent deviation between the subsequent percussion procedure and the reference percussion procedure. The step to evaluate 511 how the deviation has changed after the adjustment is then based on a comparison between the deviation and the subsequent deviation.

By adhering to the method described above, the drilling process of the drilling machine 1 will be controlled. For the sake of clarity it should be noted that the above steps may be executed a number of times during drilling, such as with each impact of the percussive element 7.

The reference percussion procedure may describe a desired drilling process. The one or more drilling parameters may relate to one or more of flushing, rotational speed of the rock drill, feed force, percussion power, percussion frequency, stroke length, percussion speed, rotational torque or the waveform of the impulse. Said collected data may comprise data related to strain of the tool during operation.

The invention claimed is:

1. A method of controlling a drilling process of a drilling machine, the drilling machine comprises a control unit, at least one sensor, a percussive element and a tool, wherein an end of the tool comprises a drill bit configured to strike rock, and wherein the percussive element is configured to impact the tool and the tool is configured to transfer impulse energy generated by the percussive element to the drill bit, the method comprises:

collecting measured data depending on force fed into the rock and indentation depth into the rock at an impact of the percussive element, wherein the collected data comprises data related to strain of the tool in operation, determining a force-displacement curve based on the collected data, determining a deviation between the force-displacement curve and a reference force-displacement curve determined based on a desired drilling process, and adjusting one or more drilling parameters related to the drilling process based on the deviation.

2. The method according to claim 1, wherein the step of adjusting one or more drilling parameters comprises:

adjusting the one or more drilling parameters to reduce the deviation.

3. The method according to claim 1, wherein the method further comprises:

analyzing properties of the deviation, based on the analysis, determine one or more first drilling parameters that need to be adjusted to reduce the deviation, out of the one or more drilling parameters, wherein the step of adjusting the one or more drilling parameters comprises:

adjusting the one or more first drilling parameters to reduce the deviation.

4. The method according to claim 1, wherein the method further comprises:

analyzing properties of the deviation, based on the analysis, determining a first manner of adjusting the one or more drilling parameters to reduce the deviation, wherein the step of adjusting the one or more drilling parameters comprises:

adjusting the one or more drilling parameters in the first manner to reduce the deviation.

5. The method according to claim 1, wherein the method further comprises:

executing a critical action if the deviation exceeds a threshold value, wherein the critical action comprises one or more of:

visually indicating that the threshold value has been exceeded, indicating that the threshold value has been exceeded by emitting an audio signal, and interrupting the drilling process.

6. The method according to claim 1, wherein the method further comprises:

evaluating a change in the deviation after the adjustment, and adjusting the one or more drilling parameters based on the evaluation to reduce the deviation.

7. The method according to claim 6, wherein the evaluation comprises:

collecting a subsequent set of data depending on force fed into the rock and indentation depth into the rock at a subsequent impact of the percussive element, determining a subsequent percussion procedure based on the collected data, determining a subsequent deviation between the subsequent percussion procedure and the reference percussion procedure, and evaluating a change in the deviation after the adjustment based on a comparison between the deviation and the subsequent deviation.

8. The method according to claim 1, wherein the method is performed with each impact of the percussive element.

9. The method according to claim 1, wherein the one or more drilling parameters relate to one or more of:

flushing flow, rotation speed of the rock drill, feed force, percussion power, percussion frequency, stroke length, percussion speed, rotational torque, waveform of an impulse.

10. A drilling machine comprising a control unit, at least one sensor, a percussive element and a tool, wherein an end of the tool comprises a drill hit configured to strike rock, and wherein the percussive element is configured to impact the tool and the tool is configured to transfer impulse energy generated by the percussive element to the drill hit, wherein the control unit is configured to:

collect measured data depending on force fed into the rock and indentation depth into the rock at an impact of the percussive element, wherein the collected data comprises data related to strain of the tool in operation, determine a force-displacement curve based on the collected data, determine a deviation between the force-displacement curve and a reference force-displacement curve determined based on a desired drilling process, and adjust one or more drilling parameters related to the drilling process based on the deviation.

11. The drilling machine according to claim 10, wherein the drilling machine is a rock drilling machine.

* * * * *